United States Patent [19]

Scampini

[11] Patent Number: 4,726,733

[45] Date of Patent: Feb. 23, 1988

[54] VARIABLE DIFFUSER ELEMENT

[76] Inventor: Daniel Scampini, 64 B Woodhollow, Twin Lakes Apts., Clifton Park, N.Y. 12065

[21] Appl. No.: 923,963

[22] Filed: Oct. 28, 1986

[51] Int. Cl.[4] .............................................. F04D 29/28
[52] U.S. Cl. ...................................... 415/131; 415/157
[58] Field of Search ............... 415/131, 141, 157, 158, 415/126–128, 129, 132; 416/142 R

[56] References Cited

U.S. PATENT DOCUMENTS

| | | | |
|---|---|---|---|
| 2,693,677 | 11/1954 | Stalker | 415/141 X |
| 2,792,983 | 5/1957 | Stalker | 415/141 X |
| 2,986,218 | 5/1961 | Wagner et al. | 415/131 X |
| 3,561,883 | 2/1971 | Berry | 415/131 |
| 4,070,132 | 1/1978 | Lynch | 415/131 X |
| 4,375,939 | 3/1983 | Mount et al. | 415/157 |

FOREIGN PATENT DOCUMENTS 58-30890  2/1983  Japan ................................. 416/142

Primary Examiner—Robert E. Garrett
Assistant Examiner—Joseph M. Pitko
Attorney, Agent, or Firm—Schmeiser, Morelle & Watts

[57] ABSTRACT

A moveable, ovoid body for incorporation in and with the conventional elements of a turbo jet and possessing compressor and diffuser shape characteristics that are found in turbo jet machines. The invention is designed to take the place of conventional diffusers which are employed in both compressor and turbine stages of turbojets. When used with the hydrovapor engine, developed by the inventor, the moveable diffuser shell which operates in conjunction with impeller and turbine propeller blades offers a wide range of selectable operational parameters such as inlet flow velocity, compression chamber pressure and exhaust velocity.

3 Claims, 5 Drawing Figures

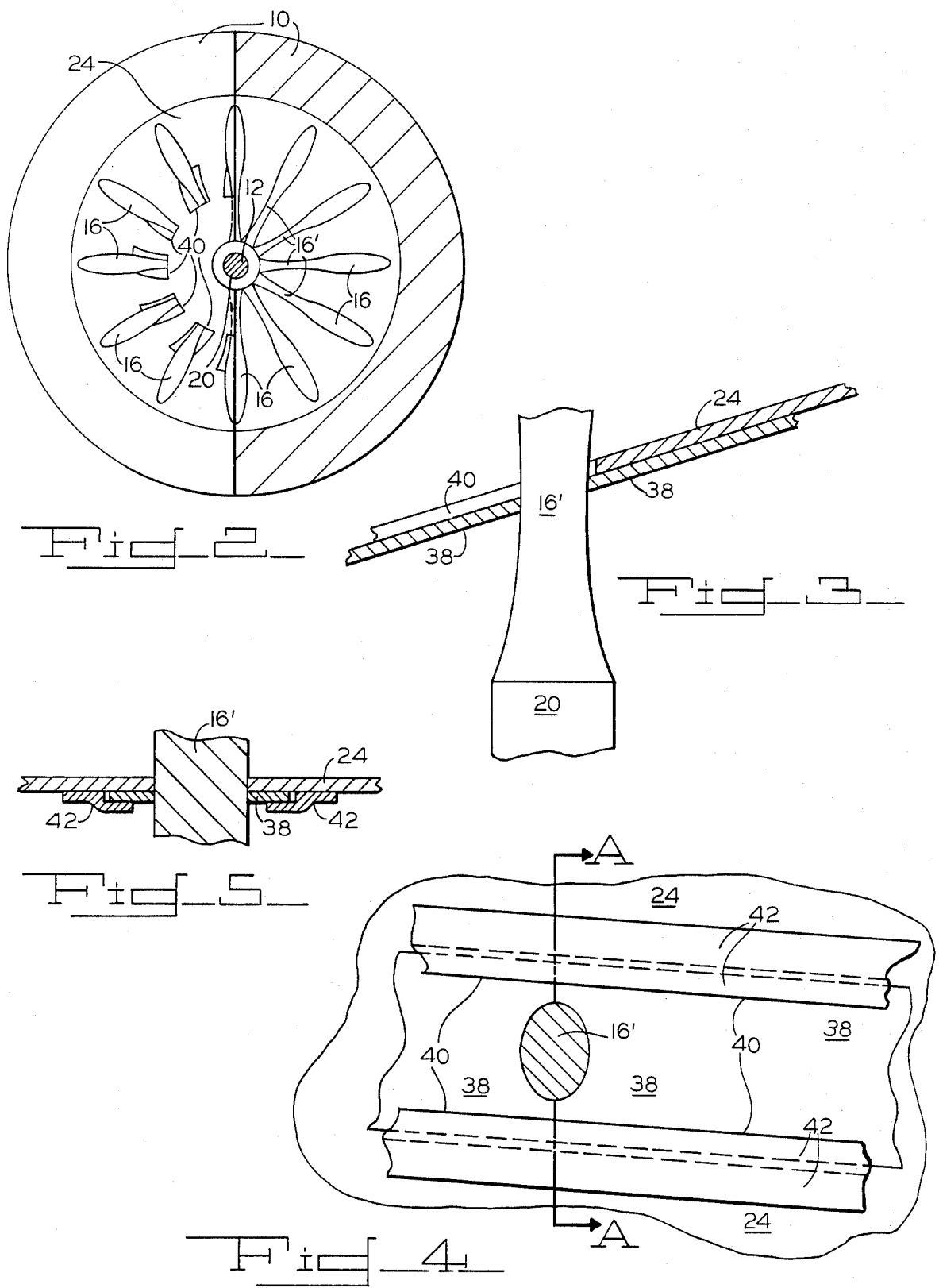

VARIABLE DIFFUSER ELEMENT

Field of the Invention

This invention relates generally to engines and pumps which employ bladed impellers and compression mechanisms such as propellers and turbines and, more specifically, to diffusers which are often used in conjunction with such mechanisms, but do not provide the base for blade or bucket mounting.

BACKGROUND AND OBJECTS OF THE INVENTION

Turbojet engines and turbopumps have employed diffusers, in their conventional sense, aft of compressor and impeller stages, as well as aft of a turbine stage. In the former instance, a diffuser is necessary to disperse the molecules of compressed fluid (air) prior to induction of fuel. In the latter, it is often advisable to disperse the exhaust product after it has passed the turbine (output) stage.

Notwithstanding the dispersing effects of the diffuser, a great deal of compression action (or in the case of a hydro vapor engine, liquid fluid restriction) may be obtained by designing diffuser members so that the forward or upstream end will cooperate, through interactive geometry, with intake and combustion chamber surfaces, to restrict passage of the working fluid. Thus, if the working fluid is gaseous, it will be compressed upon passing the forward portion of a compressor diffuser and before exiting through the turbine. In actuality, these compression portions of the engine are usually of fixed shape and have rarely been considered as meriting design for variability in operation.

An exception to the foregoing general statement is found in the prior art and most often characterized as attempts to vary inlet flow characteristics of ram-and turbojet engines by either reshaping the inlet surfaces or moving a plug, nose cone or spike a short distance forward or aft of some index within the engine. That such devices, forward of compressor stages only, would perform their function is not argued herein; but what I feel is novel about my invention is a design of impeller/compressor/turbine in combination with a moveable diffuser, in a single engine or pump member. To my knowledge, acquired from conducting exhaustive literature searches and reading myriad patents, this combination has never been suggested nor attempted.

Save for rare attempts to combine both compression and dispersion characteristics, by altering engine interior surfaces or by the suggestion of a movable plug (for the ramjet), no hint or a singular device—in the turbojet or turbopump—has appeared. This more than likely derives from the fact that, in every case of turbine design, the blades of compressors, impellers, turbines, etc. are mounted to a body, a sizable portion of which serves as a compression or restriction feature working in cooperation with the interior, constrictive engine surfaces.

Having pointed out the complete lack of prior art and inventions in the subject area, it is intuitive that an object of this invention should be to provide a jet engine member that can function as a movable impeller/compressor-diffuser.

It is another object of this invention to provide a impeller/compressor-diffuser design which can function with blade members such as characterize turbines, pump impellers, compressors, etc.

It is another object of this invention to provide a means which will easily translate the compressor-diffuser for and aft along the turbine shaft.

I have designed an impeller-diffuser member to be used in my patented Hydrovapor Free Turbine Engine (U.S. Pat. No. 4,578,943). Such a device is preferably embodied as a shaft-borne body which bears a plurality of propeller blades about its periphery. One versed in the art will recognize that such a use can be employed in air breathing engines of the turbojet/turbofan class. For the remainder of this paper, I shall discuss the impeller/compressor-diffuser in combination with propeller mechanisms and in a liquid working fluid environment. It must be understood that similar, partial or complete applications can be made to air breathing turbojet engines. In an earlier work, it was hypothesized that, for most air breathing jet propulsion engines, there exists a hydro or water analog (see "State of the Art: Propulsion" by Victor de Biasi, Space/Aeronautics, Jan. 1960). For this particular application, the converse of that generalization will apply equally.

The objects and advantages of this invention are set forth herein and will either be obvious herefrom or may be learned by practice with the invention.

SUMMARY OF THE INVENTION

The diffuser geometry comprises a shell (housing) of the desired shape. In actuality, a plurality of propellers are based or attached circumferentially on the turbojet or pump main shaft. The diffuser shell is assembled about the shaft enveloping blades/propellers near the propeller roots and is slotted so that it can be moved forward and aft, traversing the shaft while passing freely by the propeller roots. Internal means, in the form of traction motors, are housing-mounted to engage the main shaft and effect the fore-aft traversing motion of the impeller-diffuser housing while causing it to rigidly follow the shaft/propeller revolution. I have employed "follower" type slot covers which are in floating contact with the propeller roots and which travel on flanges interior to the impeller-diffuser shell, coextensive with the slots. This was done to obviate cavitation which would be present were the slots not kept closed during operation. For the most part, the impeller-diffuser interior is filled except in the spaces which are necessary to allow passage of the propeller roots. This, in the preferred hydrovapor engine embodiment, prevents an asymmetrical filling of the impeller-diffuser shell by the liquid working fluid and a consequential unbalanced shaft.

It should be understood that the foregoing general description and the following detailed description as well are exemplary and explanatory of the invention, but they are not intended to restrict, constrain operation of nor experimentation thereon. Since the invention is particularly adaptable to the hydrovapor turbine engine, reference is continually made herein to such usage as an example of a practical and useful embodiment of the invention. The drawings accompanying the description illustrate the preferred embodiment and shall serve to explain the principles of the invention; however, they should not be read as a limitation thereon.

BRIEF DESCRIPTION OF THE DRAWINGS

Of the drawings:

FIG. 2 is a partial cross section, frontal view of the impeller-diffuser;

FIG. 3 is a sectional side view of the propeller root section and slot cover mechanism;

FIG. 4 is a bottom view of a diffuser slot cover mechanism; and

FIG. 5 is a sectional front/rear view of a slot cover resting on guide flanges, behind a propeller root section.

DETAILED DESCRIPTION OF THE PREFERRED EMBODIMENT

Figure 1:
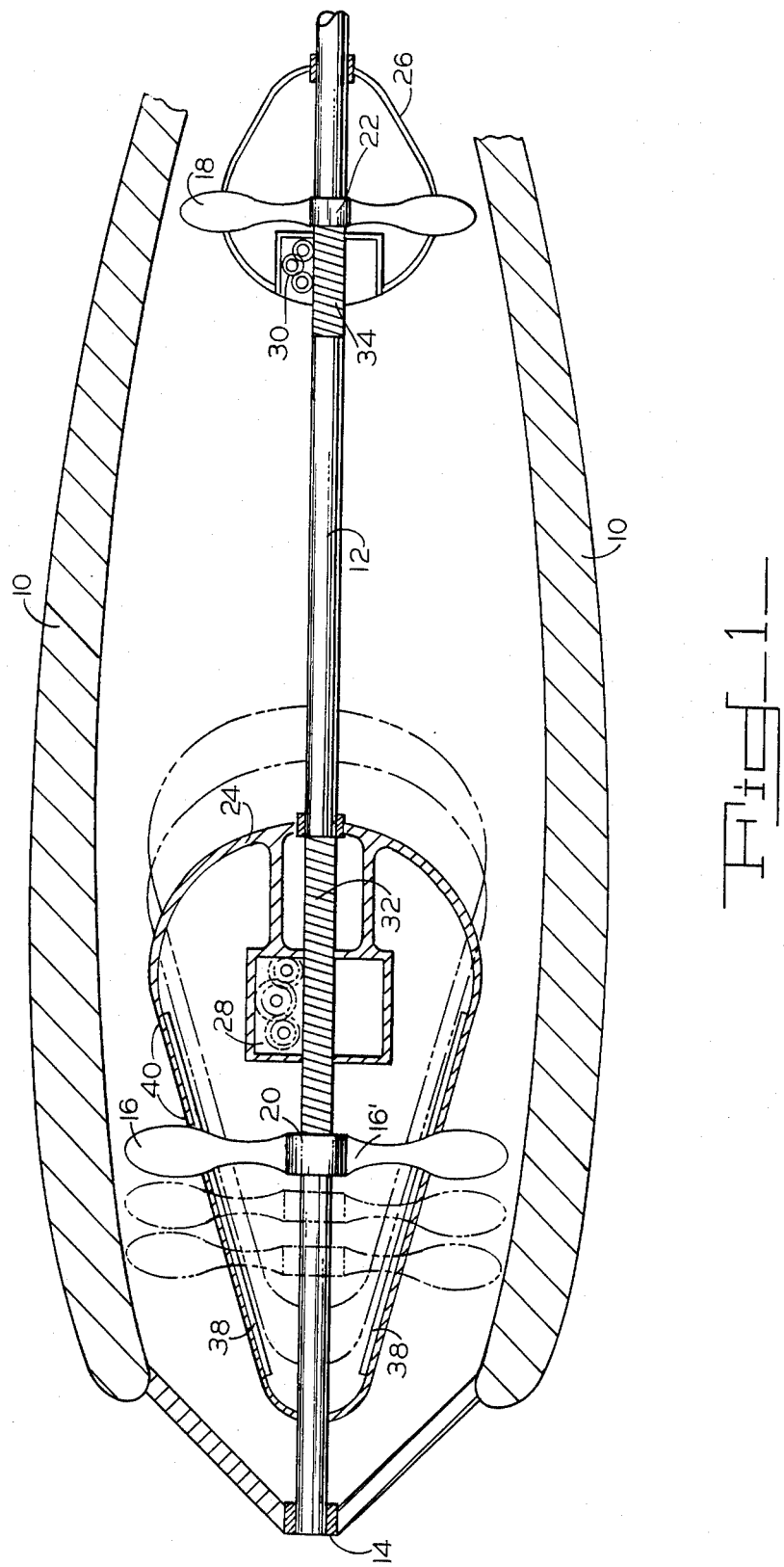
FIG. 1 is a cross sectional side view of the variable impeller-diffuser installed fore and aft in a turbojet.

FIG. 1 is a cross sectional view of the variable impeller-diffuser (or turbine-diffuser) as it would appear installed in both fore and aft positions of a turbojet engine or a turbopump.

The body of the engine 10 encloses the entire system which is mounted on the central turbine shaft 12. The shaft is allowed to turn freely in bearing 14 (aft bearings are not shown). Compressor stage propellers 16, as well as turbine stage propellers 18, are rigidly fixed to the turbine shaft at propeller mounts 20 and 22, respectively. Forward diffuser housing shell 24 and aft diffuser housing shell 26 are movably mounted on the shaft in the position shown so that their forward sections fit over the propeller blades and their traction mechanisms 28, 30 engage traction treads 32, 34, respectively. As the turbine shaft rotates, the rigidly mounted propellers 16, 18, in direct contact with diffuser shells, carry said shells in the direction of rotation. As the shells are moved forward and aft, independently through action of their traction mechanisms 28, 30 engaging the shaft traction treads 32, 34, they cover or uncover more of the propeller blades. As propeller blades ostensibly move through the diffuser slots 40, slot covers 38 precede the leading edges, as well as follow the trailing edges of the propeller blades.

The effect of the aforementioned operation is to selectively move diffuser shells in relation to the fixed propeller blades so that selective blade areas are exposed to the working fluid of the engine. For example, moving the forward diffuser shell in a aft direction would expose up to the maximum usable blade area. This would allow the output torque derived from the turbine section to drive the impeller section and provide maximum impulse to a liquid fluid (or compression to a gaseous fluid). In the like manner, by moving the diffuser shell forward, the compression or impulsion could be lessened. The same phenomenon can be experienced in similar movements of the aft diffuser shell of the turbine section.

FIG. 2 is a partial cross section, frontal view of the impeller-diffuser as would likely be seen in a typical forward section (compression/impeller) stage. Within the engine body 10, the forward diffuser shell 24 is depicted as it is mounted on the turbine shaft 12. The left hand section, depicting the covered propeller blades 16 is clearly seen with the propeller blades projecting through the diffuser slots 40. It must be noted, from this frontal view, that the propeller blades 16 expose a considerable portion of their surface area if not prevented from doing so by the diffuser shell. The propeller blade root areas 16', even if not so protected, would pose little in the way of work surface to the incoming, working fluid. Slot covers 38 have not been depicted in this figure, for reasons of clarity.

Referring now to FIG. 3, there is depicted a sectional side view of the typical propeller root section and its associated slot cover mechanism. As the propeller root 16 moves through the slotted area 40 of the diffuser shell 24 (actually the propeller blade remains stationary and the diffuser shell moves), the slot covers 38 are urged to move correspondingly in the same direction by the propeller root. Follower covers may be urged in this same direction by a spring mechanism (not shown, but well known in the art) which is located in the slot covering mechanism. Both leading and trailing slot covers (depending upon which direction the propeller is "moving") are secured and mechanized in the same fashion because they perform identical functions. As is also well-known in the art, the covers may be of a single piece having a centrally located hole. The propeller roots would be mounted by passing them down through the central slot-cover holes and inserting them into their respective mounts 20, 22. Thus, biasing spring mechanisms may be eliminated and the slot covers will perform essentially as aforementioned. This method is hereinafter termed "root-drag."

The mounting of all propellers is the same, whether in an impeller section or turbine section. In FIG. 4, the viewer is given a sectional view of a slot cover mechanism looking outward from the root of the propeller blade. Inside and below the diffuser slot 40 the propeller root 16' projects outward and is seen as the most prominent feature of this figure. On both sides of the slot opening 40, are flanges 42. Cross sectionally, the flanges are shaped in the form of a shallow "S". The slot covers 38 are machined to fit rather snuggly about the propeller blade root 16'.

FIG. 5 is a cross sectional view of the mechanism depicted in FIG. 4, taken at AA. It is a sectional front-/rear view of a slot cover resting on guide flanges 42 behind a propeller root section 16'. In this figure, the shallow "S" configuration of guide flanges 42 is readily seen. In operation, the propeller root 16' remains stationary while the diffuser shell 24 moves (for explanation purposes) directly into or out of the page. The slot covers 38 will either be pushed by the (seemingly) moving propeller blade root or urged to follow the propeller root by any of the aforementioned techniques (spring-biasing or root-drag).

Depending upon the length of the propeller blade root section, as well as variation in its cross sectional area or curvature, the slots 40 may have to be slightly curved (arced) to allow a small rotation of the diffuser shell as it traverses its operational positions. For most of the immediately foreseeable uses however, the slots may approximate proper rectangular geometries.

The aforementioned, as well as many other modifications or innovations may be made to this invention after suitable practice with it. The invention in its broader aspects is therefore not limited to the specific embodiments herein shown and described but departures may be made herefrom within the scope of the accompanying claims.

What is claimed:

1. In combination with conventional elements of a turbojet machine a diffuser for bladed impellers and turbines comprising:
    a moveably mounted, essentially ovoid housing which envelops impeller or turbine blades proximate their root areas;
    positioning means for orienting said housing relative to respective intake or exhaust ports of said machine and said blades, and for maintaining said housing in variable registry with and cooperating with intake, combustion chamber and exhaust surfaces of said turbo jet machine; and motive means for translating said housing along the principal working fluid flow axis between said intake and said exhaust ports, whereby at certain points along the flow axis the ovoid housing will envelop more or less of said blade root areas thus exposing relatively less or more of the blade portions to contact with the working fluid.

2. The invention of claim 1 wherein positioning means for orienting said housing comprises the main shaft of a turbojet engine.

3. The invention of claim 2 wherein said motive means for translating said housing is a traction motor geared to follow a tread located on said main shaft.

* * * * *